Oct. 27, 1953     G. H. MOWERS     2,657,372

CLAMP RETAINER

Filed Sept. 17, 1952

INVENTOR.
GUILFORD H. MOWERS
BY
Bailey, Stephens & Huettig
ATTORNEYS

Patented Oct. 27, 1953

2,657,372

UNITED STATES PATENT OFFICE 2,657,372

CLAMP RETAINER

Guilford H. Mowers, Fargo, N. Dak.

Application September 17, 1952, Serial No. 309,999

5 Claims. (Cl. 339—264)

1

This invention relates to a retainer for clamps. In particular the invention is directed to a retainer for the eye bolt of a so-called "hot line clamp."

In electrical transmission lines, tap-offs are frequently made with so-called hot line clamps which generally consist of a clamp having a threaded eye bolt to open and close the jaws of the clamp. Because of vibrations set up in the wires, particularly in overhead transmission lines, the eye bolt frequently works loose, thus opening the clamp, and causing failures and outages on the electrical line. Attempts to keep the clamp jaws from working loose by making the threads of the eye bolt finer, or by incorporating springs within the jaws of the clamp, have not been entirely successful.

The objects of the instant invention are to produce a universal external retainer for the eye bolt of a hot line clamp; to produce a retainer which will prevent the eye bolt from working loose under line vibration, and to produce a retainer which can be applied to conventional hot line clamps with the tools ordinarily used in high voltage electrical work.

In general, these objects are obtained by forming a spring member which has one end looped over the head of the eye bolt, and the other end secured to and braced against the opposite end of the clamp. This member includes a coil spring so that it is urged into connection with the clamp, and prevents the eye bolt from turning. It can be attached to conventional energized hot line clamps with the use of insulated pliers or other tools ordinarily used in this work. The spring member is of such light weight as not to place any harmful load on the clamp.

The means by which the objects of the invention are obtained are described more fully with respect to the accompanying drawings in which.

Figures 1, 2:
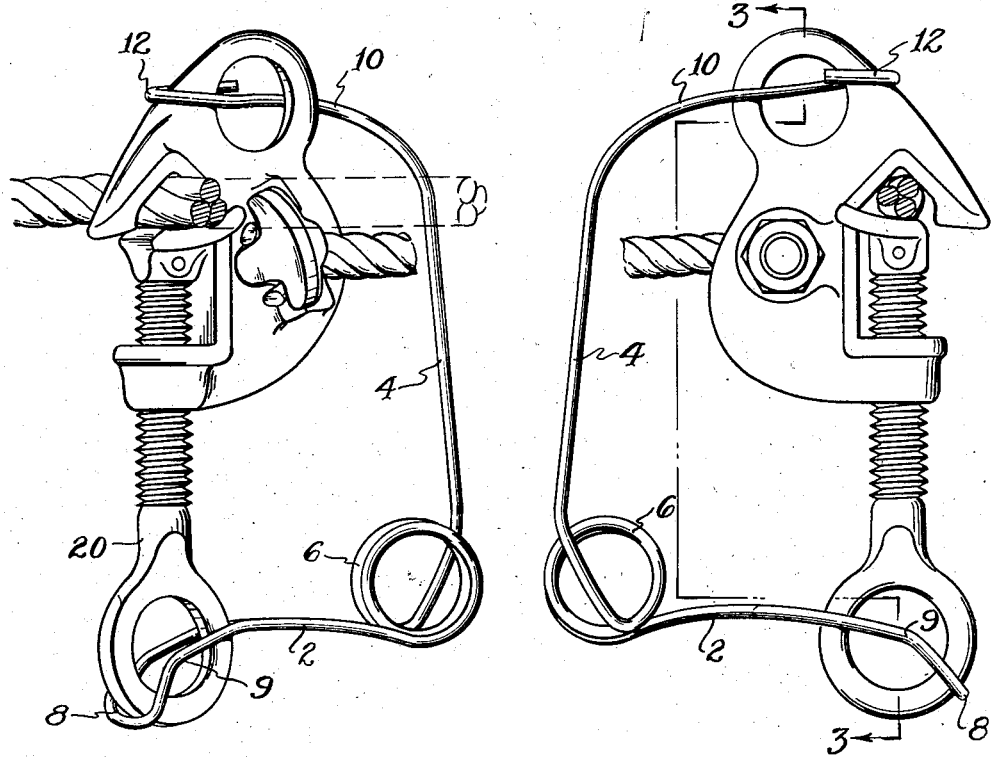
Figure 1 is a perspective view showing the retainer applied to a clamp.
Figure 2 is a side view of the retainer applied to a clamp.
Figure 3:
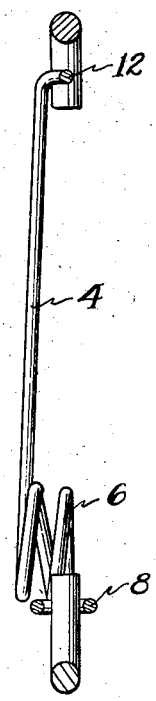
Figure 3 is a cross-sectional view on the line 3—3 of Figure 2.

In Figure 1, the retainer is composed of a piece of spring wire bent to form legs 2 and 4, these legs being substantially perpendicular to each other, and being interconnected by a coil spring portion 6. A closed loop 8 is formed at the free end of leg 2, by bending the wire back upon itself and fastening the end to leg 2. The outer portion of this loop is bent at 9 to form an angle with the remainder of the loop. Leg 4 has its free end 10 bent to be substantially parallel to leg 2, and the free end of portion 10 is turned back laterally to form an open hook 12. The retainer has the general form of a C.

The conventional hot line clamp has a threaded eye bolt 20, which operates one jaw of the clamp. As shown in the drawings, the loop 8 of the retainer is placed over the head of the eye bolt, and the hook 12 is braced by being passed through an eye on the yoke body of the clamp opposite the eye bolt and hooked on the edge thereof. The stiffness of the wire is such as to thus prevent the eye bolt from turning, as a turning force would have to be such to bend the portion 10 of the wire where it is braced as it passes through the eye in the clamp. Spring 6 prevents the loop 8 from coming loose from the head of the eye bolt, while the bend at 9 shortens the length of loop 8 so that the bight of the loop rides on the outer end of eye bolt 20.

The practical significance of this retaining means is as follows. When the clamp is initially applied to the electric cable, the closing of the jaws tightly on the cable causes in time a cold flow of the metal in the cable. A loose connection then exists, and as the pressure has been removed from eye bolt 20, vibrations in the electric line due to the winds and other recognized forces, will cause the eye bolt to work open further. While the initial loosening of the clamp by reason of the cold flow of metal will not create radio disturbances, or arcing and burning of the conductors where clamps are not overloaded, the further loosening by vibration is sufficient to open the clamp enough to cause the aforesaid troubles. The retainer of the instant invention prevents this further opening of the jaws of the clamp. No radio disturbance is created by the retainer.

Another advantage of the retainer is that it is externally applied to the clamps in position on a transmission line. This means that the clamp does not need to be unattached from the line, so that the danger of a sudden reversal of current feed in a supposedly dead line is avoided.

Having now described the means by which the objects of the invention are obtained, I claim:

1. A retainer for the eye bolt of a hot line clamp comprising a spring wire bent to form first and second portions at substantial right angles to each other, the first portion being further bent to lie substantially parallel to said second portion, a hook on the free end of said first portion, and said second portion terminating in a loop adapted to engage the head of an eye bolt.

2. A retainer as in claim 1, said first and second portions being interconnected by an integrally formed spring portion.

3. A retainer as in claim 2, said loop having its outer portion bent at an angle to the remainder of said loop.

4. In combination with a hot line clamp having a yoke formed with a stationary jaw and an eye in said yoke, and an eye bolt mounted in said yoke for actuating a movable jaw, a retainer comprising a length of spring wire having a hooked end extending through the eye in said yoke and hooked to and braced against said yoke, and said wire having its other end secured to the head of said eyebolt to prevent said eye bolt from turning.

5. In the combination of claim 4, said wire further including a coil spring portion intermediate the ends thereof.

GUILFORD H. MOWERS.

No references cited.